W. T. FRY.
Flasks and Bottles.
No. 6,613.
Reissued Aug. 24, 1875.
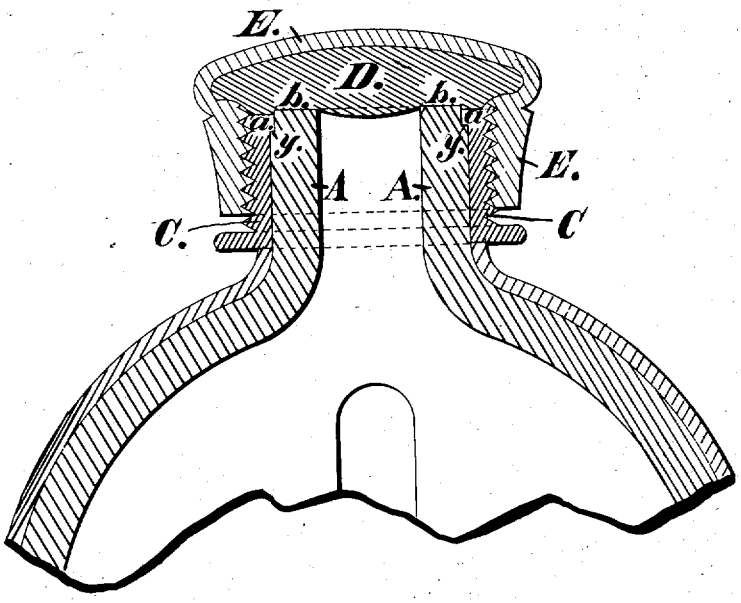
Witnesses:
Stanley Williams
John Ray
Inventor:
William T. Fry
By A. McStout Atty

UNITED STATES PATENT OFFICE.

WILLIAM T. FRY, OF BROOKLYN, NEW YORK.

IMPROVEMENT IN FLASKS AND BOTTLES.

Specification forming part of Letters Patent No. 40,338, dated October 20, 1863; reissue No. 6,613, dated August 24, 1875; application filed July 29, 1875.

*To all whom it may concern:*

Be it known that I, WILLIAM T. FRY, of Brooklyn, New York, have invented an Improvement in Flasks and Bottles, of which the following is a specification:

My invention relates to providing the neck of a glass bottle or flask with an encircling collar which shall extend up to, or nearly up to, the top of the neck, and fastening such collar around such neck in any suitable manner, and then providing such collar with a male screw-thread; and, further, in providing a cap for the top of the neck of such bottle or flask, which cap shall be provided with a female screw-thread within its cylindrical portion, to fit upon and correspond with the thread upon said collar, and the top of such cap should be lined with soft india-rubber or other like elastic substance, and the parts shall be so arranged and shall so coact together that when the collar is fastened around the neck, as aforesaid, such cap may be screwed down upon the collar, and the elastic lining of the cap brought down and held with force against the top edge of the neck of the bottle or flask, so as to make a fluid-tight joint therewith. Prior to my invention screw-collars were in use for the necks of bottles and flasks; but such collars were made to extend at their top ends inwardly over the glass edge of the neck, and the result of such construction was, that the contents of the bottles, whether liquid or gaseous, would have contact with the metal of the collar, and might, according to their character, corrode or otherwise affect the collar itself, and if it should be fastened upon the neck of the flask by means of cement, then the contents might affect and destroy such cement, and upon the other hand the contents themselves might be rendered impure or valueless by the effects of corrosion of the metal or other chemical action between them and the metal and cement; but the result of my improved construction is, that the contents cannot possibly come in contact with anything outside the flask save the cork lining.

In the accompanying drawings, A and A indicate the neck of glass bottle or flask; C and C, the screw-collar, and E the screw-cap in position on the neck and collar; and D, the cork or other elastic lining of the top of the cap; *a* and *a*, an annular recess extending around the top of the glass neck; and *y y*, the corner presented below the line of the recess. This recess and corner were supposed, when my invention was first made, to be necessary or useful in fastening the screw-collar upon the neck by means of a cement which I then and now use for that purpose, and, in fact, they may be useful now, but they form no essential part of my invention; neither does the mode of fastening the screw-collar upon the neck of the bottle, for this could be done in any suitable manner.

What I claim as my invention, and desire to secure by Letters Patent, is—

The combination of the screw-collar C, fastened upon the glass neck A in any suitable manner, and the screw-cap E, provided with the cork or other elastic top-lining D, adapted to force and hold the lining D down upon the edge of the glass neck and form an impervious joint therewith, substantially as shown and described.

WM. T. FRY.

Witnesses:
JOHN J. DRAKE,
JOS. W. MORSE.